(12) United States Patent
Hamanaka et al.

(10) Patent No.: US 9,601,984 B2
(45) Date of Patent: Mar. 21, 2017

(54) POWER CONVERTER

(75) Inventors: Yoshiyuki Hamanaka, Kariya (JP); Tsuneo Maebara, Nagoya (JP); Koichi Sakata, Okazaki (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1050 days.

(21) Appl. No.: 13/514,077

(22) PCT Filed: May 12, 2011

(86) PCT No.: PCT/JP2011/060922
§ 371 (c)(1),
(2), (4) Date: Jun. 6, 2012

(87) PCT Pub. No.: WO2011/142409
PCT Pub. Date: Nov. 17, 2011

(65) Prior Publication Data
US 2012/0235488 A1 Sep. 20, 2012

(30) Foreign Application Priority Data

May 12, 2010 (JP) .................................. 2010-110318

(51) Int. Cl.
*H02J 7/00* (2006.01)
*H02M 1/32* (2007.01)
*H02M 3/158* (2006.01)

(52) U.S. Cl.
CPC ........... *H02M 1/32* (2013.01); *H02M 3/1588* (2013.01); *H02M 2001/322* (2013.01);
(Continued)

(58) Field of Classification Search
CPC ............... H02J 7/00; H02J 9/00; H02P 27/00
(Continued)

(56) References Cited

U.S. PATENT DOCUMENTS 5,262,932 A * 11/1993 Stanley ................. H02M 3/337
323/272
5,619,107 A * 4/1997 Shinohara ................. B60L 3/00
307/10.7

(Continued)

FOREIGN PATENT DOCUMENTS

JP         2002-17098        1/2002
JP         2006-166495       6/2006
(Continued)

OTHER PUBLICATIONS

International Search Report for PCT/JP2011/060922, mailed Aug. 9, 2011.
(Continued)

*Primary Examiner* — Jared Fureman
*Assistant Examiner* — Joseph Inge
(74) *Attorney, Agent, or Firm* — Nixon & Vanderhye PC (57) ABSTRACT

A power converter includes a backup power source Eb provided separately from a power source Es and designed to supply power during a discharge period, and a discharging driver Mb that turns on/off an upper-arm (one) switching element in series-connected switching elements Qu and Qd based on a drive signal that has at least one of a voltage and a frequency, and drives a lower-arm (the other) switching element Qd such that it is always on, the at least one of the voltage and the frequency of the drive signal being within a predetermined range lower than a drive signal outputted from a normal driver Mu, Md.

12 Claims, 6 Drawing Sheets

(52) U.S. Cl.
CPC .... *H02M 2001/327* (2013.01); *Y02B 70/1466* (2013.01); *Y10T 307/615* (2015.04)

(58) Field of Classification Search
USPC .......................................... 307/66; 318/400.3
See application file for complete search history.

(56) References Cited

U.S. PATENT DOCUMENTS

| | | | |
|---|---|---|---|
| 6,091,615 A * | 7/2000 | Inoshita | H02M 7/53873 363/132 |
| 6,268,986 B1 * | 7/2001 | Kobayashi | H03K 17/0828 361/24 |
| 2001/0038540 A1 * | 11/2001 | Itoh | H02M 3/1584 363/17 |
| 2005/0269980 A1 * | 12/2005 | Hongo | B41J 19/202 318/66 |
| 2005/0280312 A1 * | 12/2005 | Litovsky | H02J 7/345 307/64 |
| 2010/0214055 A1 * | 8/2010 | Fuji | B60L 3/00 340/3.1 |

FOREIGN PATENT DOCUMENTS

| | | | |
|---|---|---|---|
| JP | 2008-11670 | | 1/2008 |
| JP | 2009-232620 | | 10/2009 |
| JP | 2009232620 A | * | 10/2009 |

OTHER PUBLICATIONS

International Preliminary Report on Patentability dated Dec. 20, 2012, issued in counterpart Japanese Application No. PCT/JP2011/060922 with English translation.

* cited by examiner

POWER CONVERTER

This application is the U.S. national phase of International Application No PCT/JP2011/060922 filed 12 May 2011 which designated the U.S. and claims priority to JP Patent Application No. 2010-110318 filed 12 May 2010, the entire contents of each of which are hereby incorporated by reference.

TECHNICAL FIELD OF THE INVENTION

The present invention relates to power converters equipped with switching elements connected longitudinally in series, and a driver for driving the switching elements.

BACKGROUND ART

One prior approach as means for discharging charge stored in a smoothing capacitor is to turn off one or more switching elements before a current flowing through the one or more switching elements becomes an overcurrent. Another prior approach as the discharging means is to reduce an on-voltage for a switching element to a level that prevents a current flowing through the switching element from becoming an overcurrent (see a first patent document).

ART DISCUSSED ABOVE

Patent Document

First patent document: Japanese Patent Laid-Open No. 2009-232620

DISCLOSURE OF THE INVENTION

Problems to be Solved by the Invention

However, the first patent document merely performs: switching in power-source from a power supply (VH) for supplying a high voltage to a power supply (VL) for supplying a low voltage, and simultaneous on/off control of each of the switching elements connected longitudinally in series. When the switching elements connected longitudinally in series are simultaneously turned on, a switching element may be overheated or an overcurrent may flow therethrough due to any factor, such as component failure, breakage of wire, and so on. In such a case, a power converter including the switching elements may be damaged.

The simultaneous on/off control of the switching elements connected longitudinally in series present the following problems:

The first problem is that, even if a gate voltage is adjusted to control current, the variations (individual differences) in the switching elements cause variations in the voltage applied in the switching elements to cause variations in discharge current, so that limit values for short-circuit current and overcurrent cannot be determined.

The second problem is that, because of heat generated separately from the switching elements connected longitudinally in series, means for preventing overheating must be provided for each of the upper and lower switching elements, and limit values for overheating cannot be determined.

In view of the above circumstances, an object of the present invention is to provide power converters that prevent damage to switching elements and the like, and more reliably prevent overcurrent or overheating by limiting a switching element that causes overcurrent or overheating when discharging charge stored in a smoothing capacitor.

Means for Solving the Problems

Specifically, an example embodiment of the invention, for solving the previously mentioned problems, is a power converter. The power converter includes first and second switching elements located at a high side and a low side relative to a basis electric potential and connected in series. The first and second switching elements perform conversion of power from a power source. The power converter includes a normal driver that operates on the power to drive the first and second switching elements using a drive signal having a predetermined voltage and frequency, and a capacitor connected in parallel with the first and second switching elements. The power converter includes a backup power source provided separately from the power source. The backup power source supplies power during at least one of a normal period and a discharge period. The power converter includes a discharging driver that operates on the power supplied from the backup power source, turns on/off at least one of the first and second switching elements based on a drive signal that has at least one of a voltage and a frequency, and drives the other of the first and second switching elements such that the other of the first and second switching elements is always on. The at least one of the voltage and the frequency of the drive signal is within a predetermined range lower than a corresponding at least one of the predetermined voltage and frequency of the drive signal outputted from the normal driver.

With this configuration, in addition to the normal driver, the discharging driver is provided as a circuit for driving the first and second switching elements. The discharging driver, which operates on the power supplied from the backup power source, turns on/off one switching element of the series-connected first and second switching elements based on a voltage and a frequency within predetermined ranges, and drives the other switching element of the first and second switching elements such that the other switching element is always on.

Switching elements have a characteristic in which current changes depending on control voltage. Thus, a current flows through a switching element when a control voltage for turn-on is applied thereto. In order to terminate discharging quickly, it is desired that a switching element is always on by a control voltage that completely saturates the switching element; the control voltage will be referred to merely as a saturation voltage hereinafter. For this reason, the saturation voltage is normally used as the predetermined voltage outputted from the normal driver.

However, if a switching element were always turned on by the saturation voltage, an overcurrent could flow through the switching element, which could increase the possibility of the occurrence of failure in the switching element.

In addition, switching elements have a characteristic in which they likely heat (likely increase in temperature) when repeatedly turned on/off.

Thus, the present invention turns on/off one switching element in the first and second switching elements based on the drive signal that has at least one of the voltage and the frequency. The at least one of the voltage and the frequency of the drive signal is within a predetermined range lower than at least one of the predetermined voltage and frequency of the drive signal outputted from the normal driver during discharging of the smoothing capacitor.

Thus, during discharging of the smoothing capacitor, it is possible to reduce an amount of generated heat and an amount of current in comparison to usual ones; it is possible to reduce the possibility of the occurrence of failure in the first and second switching elements and the like. Because the backup power source allows discharging of the smoothing capacitor even though the power source is shut down, it is possible to improve a fail-safe function of the power converter. It is possible to limit a switching element that causes overcurrent or overheating to the one of the first and second switching elements, thus more reliably preventing overcurrent or overheating.

Note that, as the power source, a DC power source (a battery or the like), a system power source, a converter, or the like, which, for example, can supply power, is applicable. The normal period represents a timing or period during which normal power conversion is performed, and the discharge period represents a timing or period during which charge stored in the smoothing capacitor is discharged without power conversion. Thus, the normal period and the discharge period do not overlap. As the switching elements, any semiconductor elements having switching functions, such as FETs (specifically, MOSFETs, JFETs, MESFETs, and the like), IGBTs, GTOs, and power transistors, can be used. As the smoothing capacitor, any circuit element including a storage and discharge means, such as a capacitor, which is capable of storing charge thereinto and discharging charge therefrom for performing a smoothing function, can be used. The normal driver needs be provided for each switching element, but at least one discharging driver can be provided in the power converter. The predetermined range is any range, which: is lower than at least one of the predetermined voltage and frequency of the drive signal outputted from the normal driver (that is, a signal to drive a switching element); and is capable of driving a switching element. For voltage values of the drive signal, a range including a threshold at which a switching element is switched from on to off or off to on is preferably established. For example, if the threshold is 7 V, the range from 7 to 10 V is preferably established for voltage values of the drive signal.

In an example embodiment of the invention, the discharging driver is comprised of an overheat protection means that protects the one of the first and second switching elements from overheating, thus preventing a temperature of the one of the first and second switching elements from exceeding an allowable temperature. The overheat protection means can be freely designed as means for preventing a switching element from overheating with its temperature exceeding the allowable temperature. For example, the overheat protection means can be comprised of a temperature measuring unit, such as a thermometer and a temperature-sensitive diode, which measures the temperature of a switching element, and a signal changing unit that changes, based on information indicative of the temperature measured by the temperature measuring unit, the drive signal (at least one of the voltage and the frequency). With this configuration, even if one switching element is turned on/off, the overheat protection means protects the switching element from exceeding the allowable temperature. Thus, it is possible to more reliably reduce the possibility of the occurrence of failure in a switching element and the like.

In an example embodiment of the invention, the discharging driver is comprised of an overcurrent protection means that prevents a current flowing through the other of the first and second switching elements from exceeding an allowable current value. The overcurrent protection means can be freely designed as means for preventing a current flowing through a switching element from exceeding the allowable current value. For example, the overcurrent protection means can be comprised of a current measuring unit, such as an ammeter and a sense current, which measures the current flowing through a switching element, and a control-voltage changing unit that changes the drive signal (a control voltage) based on information indicative of the current measured by the current measuring unit. With this configuration, even if the other switching element is controlled to be always on, the overcurrent protection means prevents the current flowing through the other switching element from exceeding the allowable current value. Thus, it is possible to more reliably reduce the possibility of the occurrence of failure in a switching element and the like.

In an example embodiment of the invention, the discharging driver turns on/off one switching element corresponding to the high side in the first and second switching elements according to the drive signal having at least one of the voltage and the frequency within the predetermined range lower than a corresponding at least one of the predetermined voltage and frequency of the drive signal outputted from the normal driver, and drives the other switching element corresponding to the low side in the first and second switching elements such that the other switching element is always on. With this configuration, heat is likely to be generated in the high-side switching element rather than in the low-side switching element because the high-side switching element is higher in electric potential than the low-side switching element with reference to the basic electric potential. Thus, controlling on/off drive of the high-side switching element can reduce the total heat quantity. This makes it possible to more reliably reduce the possibility of the occurrence of failure in a switching element and the like.

EMBODIMENTS FOR CARRYING OUT THE INVENTION

Embodiments of the present invention will be described with reference to the accompanying drawings. Note that, unless otherwise indicated, "connected to" means electrical connection. Successive reference characters are simplified using "-". For example, switching elements Q1-Q6 means switching elements Q1, Q2, Q3, Q4, Q5, and Q6. Directions, such as upward, downward, left, and right directions are based on the descriptions in the drawings. As an "output device" that outputs power converted by a power converter, any device can be applied. The cases where a motor-generator for vehicles, which can start an engine and generate power, is applied to an "output device" will be described as an example.

First Embodiment

Figure 1:
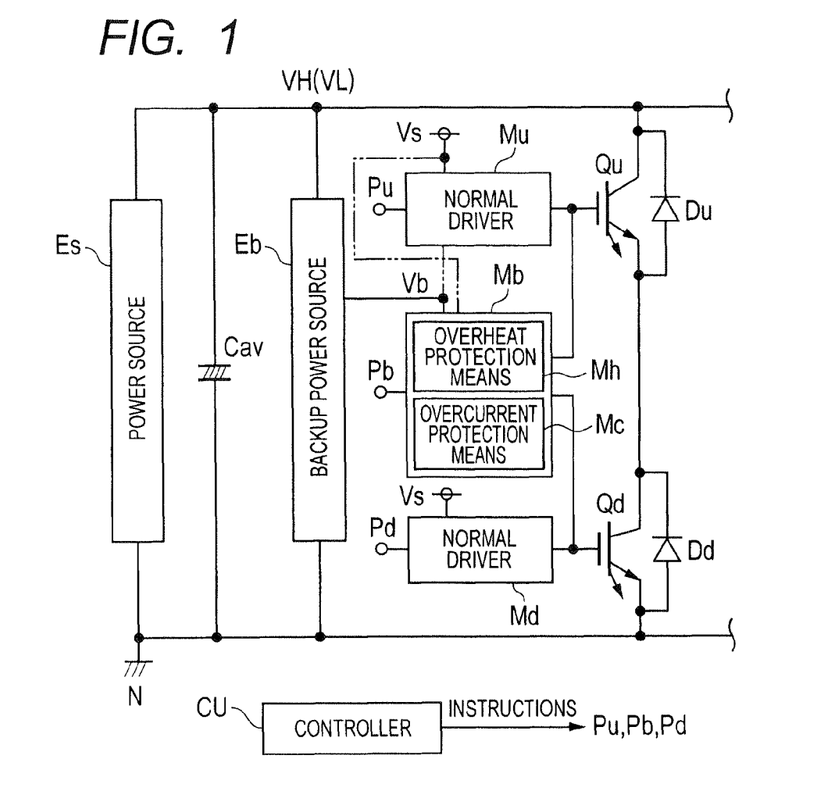
FIG. 1 is a view schematically illustrating a first example configuration of a power converter.
Figure 2:
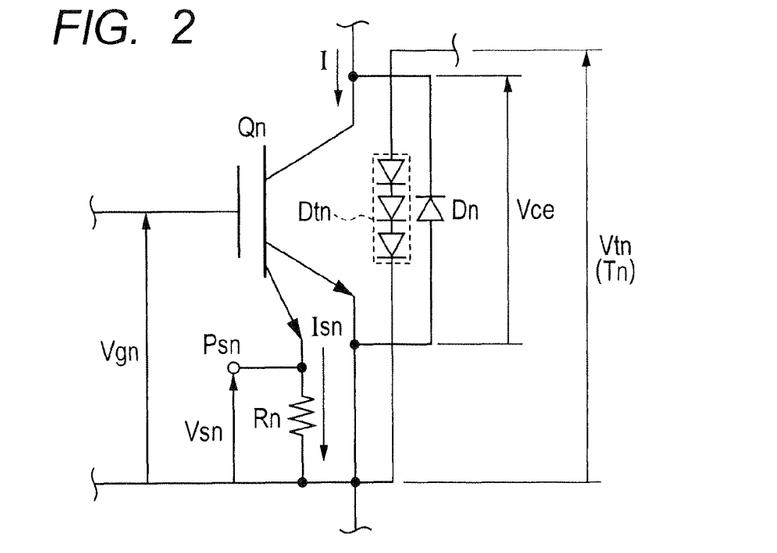
FIG. 2 is a circuit diagram illustrating an example configuration of a switching element.
Figure 3:
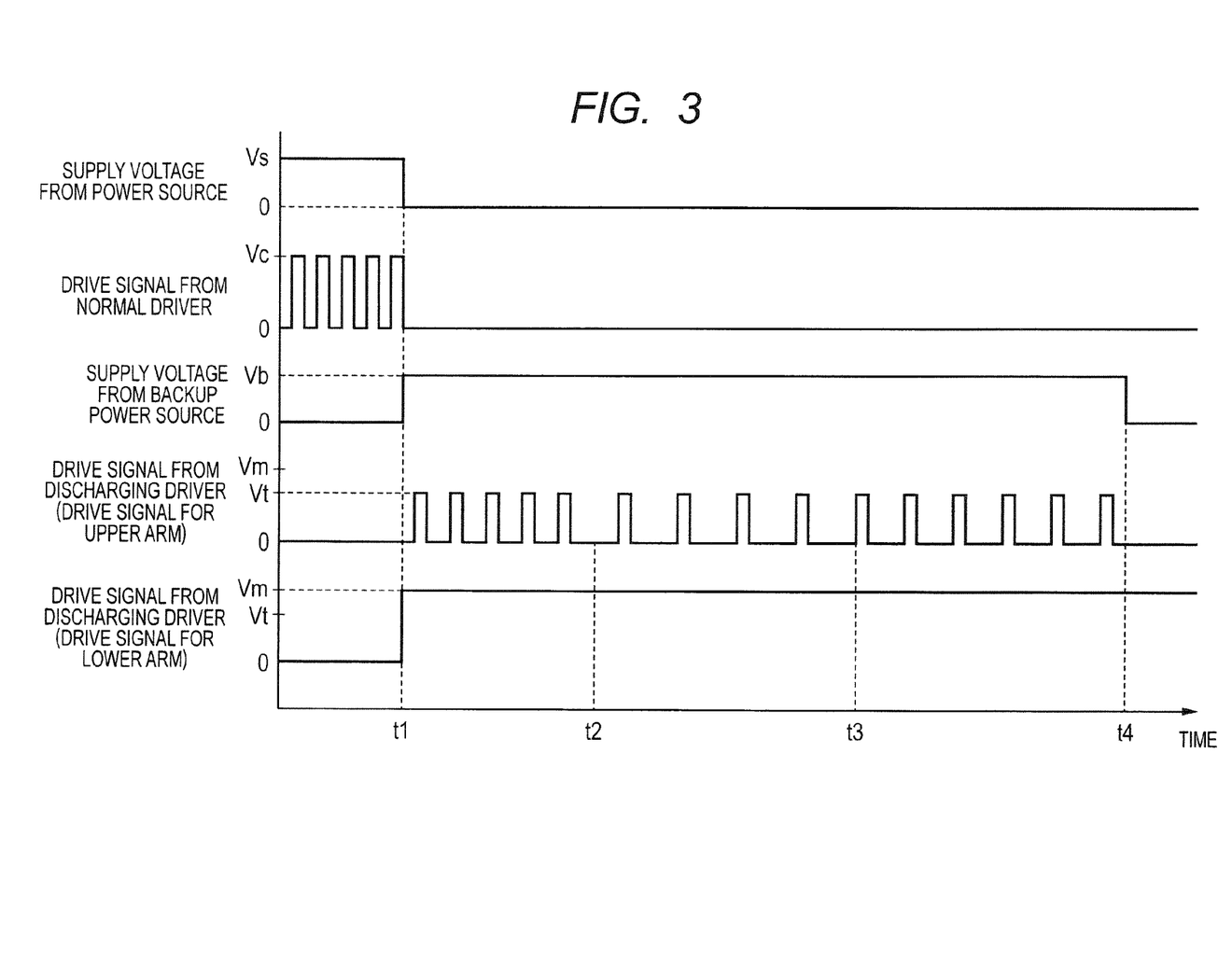
FIG. 3 is a timing chart indicative of a time-dependent change in a first example of operations during discharging.
Figure 4:
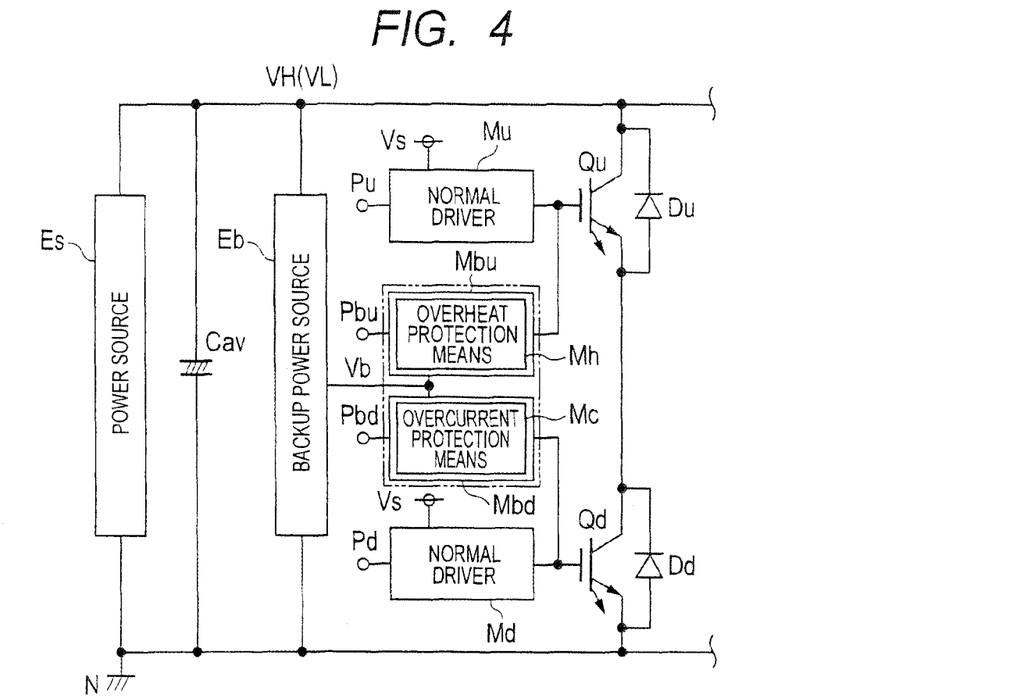
FIG. 4 is a view schematically illustrating a second example configuration of the power converter.
Figure 5:
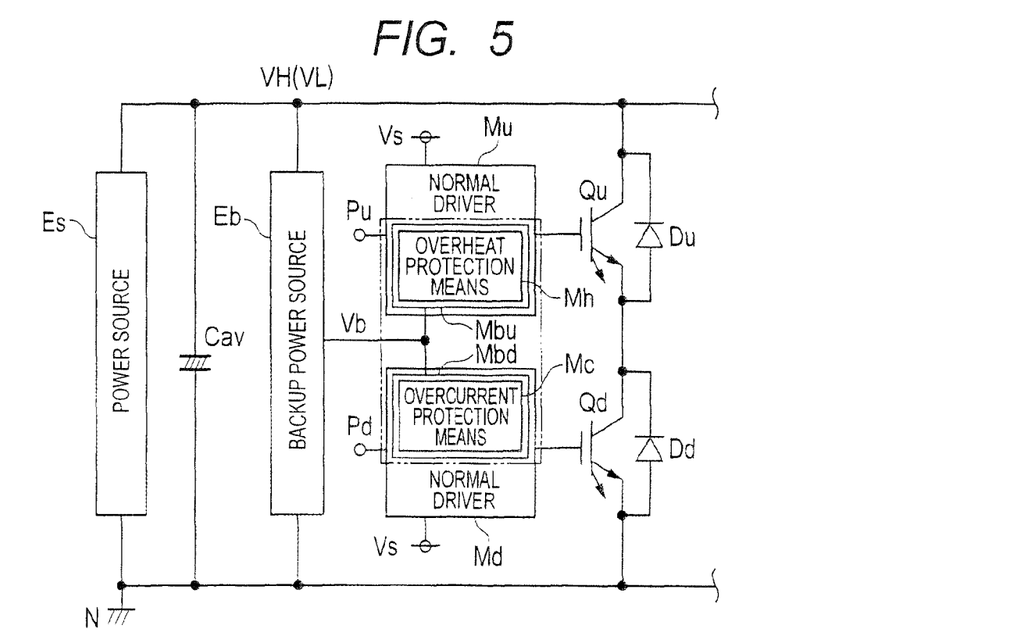
FIG. 5 is a view schematically illustrating a third example configuration of the power converter.

An example of the structure of a power converter implementing the present invention according to a first embodiment will be described with reference to FIGS. 1 to 5. FIG. 1 schematically illustrates a first example configuration of the power converter, and FIG. 2 illustrates a circuit diagram of an example configuration of a switching element. FIG. 3 illustrates a timing chart indicative of a first example of operations during discharging. FIG. 4 schematically illustrates a second example configuration of the power converter, and FIG. 5 schematically illustrates a third example configuration of the power converter.

First Example Configuration

The first example configuration will be described with reference to FIG. 1. The power converter illustrated in FIG. 1 has a function of converting power supplied from a power source Es, and outputting it.

This power converter includes a backup power source Eb, a smoothing capacitor Cav, normal drivers Mu and Md, a discharging driver Mb, switching elements Qu and Qd, diodes Du and Dd, and a controller CU. In these elements, the normal driver Mu is provided for the switching element Qu, and the normal driver Md is provided for the switching element Qd. In contrast, the discharging driver Mb is provided for each pair of the switching elements Qu and Qd connected in series and provided between the upper side (high-side) and the lower side (low-side) of the power source Es in parallel therewith. The number of other elements in these elements provided in the power converter is one or more.

The power source Es and the backup power source Eb are different power supply sources. The smoothing capacitor Cav is connected in parallel with the power source Es, and the backup power source Eb is connected in parallel with the smoothing capacitor Cav.

As the power source Es, a DC power source (battery or the like), a system power source, a converter circuit, or the like is applicable. The backup power source Eb can have at least one of: a structure that normally supplies power in parallel with the power source Es, and a structure that supplies emergency power if the power source Es cannot supply power due to any shutoff cause, such as a break in a power supplying cable or the like. For example, the latter structure converts charge, that is, power stored in the illustrated smoothing capacitor Cav as a power source into required voltage or current, and supplies it.

The smoothing capacitor Cav is operative to smooth power, especially, voltage supplied from the power source Es. As the smoothing capacitor Cav, an element capable of storing therein charge and discharging charge therefrom can be used. The location of the smoothing capacitor Cav is optional, and therefore, the smoothing capacitor Cav can be provided inside the power converter, inside the power source Es, between the power converter and the power source Es, or the like.

The switching elements Qu and Qd are connected longitudinally in series, and operative to convert power when switched on or off. The switching elements Qu and Qd are connected in parallel with the backup power source Eb.

As the switching elements Qu and Qd, semiconductor elements, such as IGBTs and power transistors, which have a switching function, are used. For implementing the present invention, a specific circuit example including the switching elements Qu and Qd will be described later (see FIG. 2). Each of the diodes Du and Dd is connected between an input terminal (for example, source, collector, or the like) and an output terminal (for example, drain, emitter, or the like) of a corresponding one of the switching elements Qu and Qd and in parallel therewith. Each of the diodes Du and Dd serves as a free-wheel diode.

Specifically, the output terminal of the switching element Qu is connected to the input terminal of the switching element Qd, and the input terminal of the switching element Qu is connected to the positive terminal of each of the power source Es and the backup power source Eb, and one end of the smoothing capacitor Cav. The output terminal of the switching element Qd is connected to the negative terminal of each of the power source Es and the backup power source Eb, and the other end of the smoothing capacitor Cav.

Each of the normal drivers Mu and Md is connected to a control terminal (for example, gate, base, or the like) of a corresponding one of the switching elements Qu and Qd. The normal drivers Mu and Md has respective terminals Pu and Pd, and the terminals Pu and Pd are connected to the controller CU.

Each of the normal drivers Mu and Md is operative to output, during a normal period in which power is converted to be outputted to an output device, a drive signal to the control terminal of a corresponding one of the switching elements Qu and Qd according to an instruction inputted from the controller CU to a corresponding one of the terminals Pu and Pd, thus individually controlling on/off of a corresponding one of the switching elements Qu and Qd. The normal drivers Mu and Md operate on power (voltage Vs) supplied from a normal driving power source (not shown). The normal driving power source includes a stabilizer and the like. The normal driving power source receives power supplied from the power source Es or the like, converts it into power, such as voltage and current, which the normal driver Mu and Md can operate, and stably supplies the converted power. To the drive signal, any signal that can drive the switching elements is applicable. In the first example configuration, the drive signal is a voltage signal with a predetermined amplitude and a predetermined frequency. To the drive signal, a pulse-width modulation (PWM) signal or a pulse-frequency modulation signal (PFM) is applicable.

The discharging driver Mb is connected to the control terminal of each of the switching elements Qu and Qd. The discharging driver Mb has a terminal Pb connected to the controller CU.

The discharging driver Mb is driven during a discharge period, that is, during a period in which discharging of charge stored in the smoothing capacitor Cav is performed; this period is other than the normal period. When driven, the discharging driver Mb outputs the drive signal to the output terminal, such as the gate, of each of the switching elements Qu and Qd, thus individually controlling on/off of each of the switching elements Qu and Qd. The drive signal is a voltage signal with a predetermined amplitude and a predetermined frequency. To the drive signal, a pulse-width modulation (PWM) signal or a pulse-frequency modulation signal (PFM) is applicable.

The discharging driver Mb is activated when receiving power (voltage Vb) supplied from the backup power source Eb, and comprised of an overheat protection means Mh, an overcurrent protection means Mc, and so on.

The overheat protection means Mh has a function of monitoring the temperature of a switching element that is to be turned on or off during the discharge period, such as the temperature of each of the switching elements Qu and Qd in FIG. 1, and protecting the switching element from overheating, thus preventing the monitored temperature from exceeding an allowable temperature. The overheat protection means Mh can be arbitrarily configured in so far as it implements this function. For example, the overheat protection means Mh is for example comprised of a temperature sensing unit and a signal changing unit. For example, a thermometer or a temperature-sensitive diode is applicable to the temperature sensing unit. The temperature sensing unit measures the temperature of the switching elements. The signal changing unit changes, based on information indicative of the temperature measured by the temperature sensing unit, the drive signal to be sent to the switching elements Qu and Qd For example, in the first example configuration, the signal changing unit changes at least one of the amplitude (voltage) and the frequency.

The overcurrent protection means Mc has a function of monitoring the current flowing through a switching element that is always on during the discharge period, such as each of the switching elements Qu and Qd in FIG. 1, and preventing an overcurrent from flowing by preventing the monitored current from exceeding an allowable current value. The overcurrent protection means Mc can be arbitrarily configured in so far as it implements this function. For example, the overcurrent protection means Mc is for example comprised of a current sensing unit and a control-voltage changing unit. For example, an ammeter or a sense terminal is applicable to the current sensing unit. The current sensing unit measures the current flowing through the switching elements. The control-voltage changing unit changes a control voltage (for example, the gate voltage) based on information indicative of the current measured by the current sensing unit.

There are two structures for outputting the drive signal from the discharging driver Mb:

The structure is that the drive signal is outputted from the discharging driver Mb according to an instruction inputted from the controller CU to the terminal Pb.

The structure, referred to as an active structure, is that the drive signal is outputted from the discharging driver Mb according to the determination of the discharging driver Mb itself.

As illustrated by, for example, the two-dot chain line, the active structure monitors power (voltage Vs) supplied to the normal drivers Mu and Md, and voluntarily outputs the drive signal to each of the switching elements Qu and Qd when the monitored power (voltage Vs) is changed from normal values to reach a preset threshold; the preset threshold, such as 3 V, is a value that brings each of the switching elements Qu and Qd to be in the state in which each of the switching elements Qu and Qd cannot perform power conversion.

The controller CU has a function of controlling the overall operations of the power converter, another device or circuit, and the like. The controller CU can be arbitrarily configured in so far as it implements this function. For example, an electronic control unit (ECU) installable in vehicles is applicable to the controller CU. In the example illustrated in FIG. 1, the controller CU individually communicates, to each of the normal drivers Mu and Md and the discharging driver Mb, an instruction to drive each of the switching elements Qu and Qd on or off.

A specific circuit example including the switching elements Qu and Qd will be described with reference to FIG. 2. FIG. 2 illustrates the circuit example based on a switching element Qn. The switching element Qn is representative of each of the switching elements Qu and Qd, and a diode Dn is representative of each of the diodes Du and Dd, which is used hereinbelow for switching elements and diodes illustrated in FIGS. 6 and 7 as well.

As well as the diode Du or Dd for the switching element Qu or Qd illustrated in FIG. 1, a diode Dn is connected between an input terminal (for example, source, collector, or the like) and an output terminal (for example, drain, emitter, or the like) of the switching element Qn and in parallel therewith. A temperature-sensitive diode Dtn is provided for the switching element Qn as a structural element of the overheat protection means Mh. For example, the temperature-sensitive diode Dtn is provided inside the switching element Qn or on the surface (one or more sides) of the switching element Qn.

As a structural element of the overcurrent protection means Mc, a sense terminal Psn is provided for the switching element Qn. In other words, the switching element Qn is equipped with the sense terminal Psn, and uses the sense terminal Psn as a structural element of the overcurrent protection means Mc. A resistor Rn is connected between the sense terminal Psn and the output terminal as a structural element of the overcurrent protection means Mc.

The temperature-sensitive diode Dtn is comprised of one or more diodes connected in series; each diode changes its interterminal voltage depending on temperature. The anode of the temperature-sensitive diode Dtn is connected to a power supply source (for example, the backup power source Eb or the like), and the cathode is connected to the output terminal of the switching element Qn. A constant current is supplied from a power supply source to the temperature-sensitive diode Dtn. A voltage Vtn across the temperature-sensitive diode Dtn depends on temperature Tn.

A control voltage Vgn, that is, a voltage of the drive signal, is applied to between a control terminal (for example, gate, base, or the like) and the output terminal of the switching element Qn for driving the switching element Qn. The magnitude of a current I flowing from the input terminal of the switching element Qn through the output terminal changes in magnitude depending on the magnitude of the control voltage Vgn. In addition, the magnitude of a sense current Isn flowing from the sense terminal Psn changes depending on the magnitude of the control voltage Vgn. A sense voltage Vsn develops across the resistor Rn through which the sense current Isn flows; the sense voltage Vsn is correlated with the sense current Isn.

The voltage Vtn is inputted to the overheat protection means Mh, and is converted by an A/D converter as a structural element of the overheat protection means Mh. The converted information (digital data) is used as the temperature information (the temperature Tn) in accordance with a correlation function that the overheat protection means Mh has between the voltage Vtn and temperature. The sense voltage Vsn is inputted to the overcurrent protection means Mc, and is converted by an A/D converter as a structural element of the overcurrent protection means Mc. The converted information (digital data) is used as the current information (the current I) in accordance with a correlation function that the overcurrent protection means Mc has between the sense voltage Vsn and the current I flowing from the input terminal of the switching element Qn through the output terminal.

An example of operations of the power converter designed set forth above will be described with reference to FIG. 3. As "one switching element", an upper-arm switching element Qu is used, and as "the other switching element", a lower-arm switching element Qd is used as an example (see FIG. 1). The horizontal axis represents time, so that it goes with time. The vertical axis represents: the change in the supply voltage from the power source Es; the change in the drive signal transferred from the normal driver Mu (Md) to the switching element Qu (Qd), the change in the supply voltage from the backup power source Eb; the change in the drive signal transferred from the discharging driver Mb to the upper-arm switching element Qu, and the change in the drive signal transferred from the discharging driver Mb to the lower-arm switching element Qd in this order.

Power (voltage Vs) is supplied from the power source Es to the normal driver Mu (Md) up to time t1, so that the normal driver Mu (Md) transmits the drive signal to the switching element Qu (Qd) according to an instruction from the controller CU. The drive signal is a pulse signal having the maximum voltage of Vc and an instructed frequency of Fc. The voltage Vc takes a value within the range between a threshold voltage Vt and a saturation voltage Vm, which is expressed by "Vt≤Vc≤Vm". The threshold voltage Vt is, for example, 7 V, and the saturation voltage is, for example, 15 V. In contrast, because the power (voltage Vb) is not supplied from the backup power source Eb, the discharging driver Mb is inactive, and therefore does not transmit the drive signal to the switching elements Qu and Qd.

At time t1, no power is supplied from the power source Es due to any shutoff cause, such as a break in a power supplying cable or the like. For this reason, the backup power source Eb starts to supply power (voltage Vb) to the discharging driver Mb. The discharging driver Mb, which receives the supplied power, transmits the drive signal to each of the switching elements Qu and Qd. The drive signal transmitted to the upper-arm switching element Qu is a pulse signal having the threshold voltage Vt as its maximum voltage and a frequency Fb1 lower than the frequency of the drive signal transmitted from the normal driver Mu (Md), which is expressed as "Fb1<Fc". The drive signal transmitted to the lower-arm switching element Qd is the constant saturation voltage Vm for causing the switching element Qd to be always on.

After the time t1, the discharging driver Mb changes the drive signal according to the current I (or the temperature Tn), and transmits it to the switching element Qu. In an example of control illustrated in FIG. 3, the discharging driver Mb changes the drive signal to a pulse signal with a frequency Fb2 lower than the frequency Fb1 at time t2, which is expressed as "Fb2<Fb1". When it is time t3, the discharging driver Mb changes the drive signal to a pulse signal with a frequency Fb3 higher than the frequency Fb2, which is expressed as "Fb2<Fb3<Fb1". Note that the magnitude relations are an example, and they are changed depending on the magnitude of the current I flowing through each of the switching elements Qu and Qd or the temperature Tn of the switching element Qu.

Second Example Configuration

The second example configuration will be described with reference to FIG. 4. A power converter illustrated in FIG. 4 shows an example configuration in place of the power converter illustrated in FIG. 1, and therefore, different points therebetween will be mainly described. For this reason, to elements, which are the same as the elements illustrated in FIG. 1, the identical characters are assigned, and the descriptions of them are omitted.

The power converter illustrated in FIG. 4 is provided with a discharging driver Mbu for the switching element Qu, and a discharging driver Mbd for the switching element Qd, which is different from the power converter illustrated in FIG. 1. An element circled by the two-dot chain line illustrated in FIG. 4 corresponds to the discharging driver Mb; this element is comprised of the separated discharging driver Mbu and discharging driver Mbd.

The discharging drivers Mbu and Mbd have respective terminals Pbu and Pbd connected to the controller CU (not shown in FIG. 4). The discharging drivers Mbu and Mbd are activated when receiving power supplied from the backup power source Eb. For implementing the control illustrated in FIG. 3, the discharging driver Mbu includes the overheat protection means Mh, and the discharging driver Mbd includes the overcurrent protection means Mc as well as the first embodiment. Specifically, the discharging driver Mbu performs only on/off drive of the switching element Qu, and the discharging driver Mbd drives the switching element Qd such that it is always on.

Third Example Configuration

The third example configuration will be described with reference to FIG. 5. A power converter illustrated in FIG. 5 shows an example configuration in place of the power converters illustrated in FIGS. 1 and 4, and therefore, different points therebetween will be mainly described. For this reason, to elements, which are the same as the elements illustrated in FIGS. 1 and 4, the identical characters are assigned, and the descriptions of them are omitted.

The power converter illustrated in FIG. 5 is configured such that the discharging driver Mu for the switching element Qu is installed in the normal driver Mu, and the discharging driver Mbd for the switching element Qd is installed in the normal driver Md, which is different from the power converters illustrated in FIGS. 1 and 4. An element circled by the two-dot chain line illustrated in FIG. 5 corresponds to the discharging driver Mb illustrated in FIG. 1. As well as FIG. 4, for implementing the control illustrated in FIG. 3, the discharging driver Mbu includes the overheat protection means Mh, and the discharging driver Mbd includes the overcurrent protection means Mc.

The first embodiment as described above achieves the following effects.

Specifically, each power converter according to the first embodiment is comprised of the backup power source Eb for supplying power during the discharge period, and the discharging driver Mb (see FIGS. 1 to 5) that:

performs on/off drive of the upper-arm switching element Qu as one of the switching elements Qu and Qd vertically connected in series by a voltage and a frequency that are within respective ranges lower than the voltage and frequency of the driven signal outputted from the normal driver Mu or Md; and drives the lower-arm switching element Qd as the other of the switching elements Qu and Qd such that the lower-arm switching element Qd is always on.

This discharges charge stored in the smoothing capacitor Cav.

The configuration set forth above turns on/off only the switching element Qu by a voltage and a frequency that are within respective ranges lower than the voltage and frequency of the driven signal used in the normal period while causing the switching element Qd to be normally on. For this reason, it is possible to limit the production of heat and reduce current during discharging of charge stored in the smoothing capacitor Cav, thus preventing to the switching elements Qu and Qd, and the like. Because this is performed even if the power source Es is deactivated, it is possible to improve the fail-safe function. It is possible to limit a switching element that causes overcurrent or overheating to the upper-arm switching element Qu as one switching element, thus more reliably preventing overcurrent or overheating.

In the power converter according to the first embodiment, the discharging driver Mb is provided with the overheat protection means Mh that protects one switching element Qu from overheating with its temperature exceeding an allowable temperature; the switching element Qu is driven on/off by a voltage and a frequency within the respective ranges (see FIGS. 1 to 5). This configuration allows the overheat protection means Mh to prevent the temperature of the switching element Qu from exceeding the allowable temperature even when the switching element Qu is driven on/off. Thus, it is possible to more reliably prevent damage to the switching element Qu and the like.

In the power converter according to the first embodiment, the discharging driver Mb is provided with the overcurrent protection means Mc that protects an overcurrent with a value higher than an allowable current value from flowing through the other switching element Qd; the other switching element is always on (see FIGS. 1 to 5). This configuration allows the overcurrent protection means Mc to protect the switching element Qd by preventing a current flowing through the switching element Qd from exceeding the allowable current value. Thus, it is possible to more reliably prevent damage to the switching element Qd and the like.

In the power converter according to the first embodiment, the discharging driver Mb is configured to:
 drive on or off the upper-arm (upper-side) switching element Qu by a voltage and a frequency that are within respective ranges lower than the voltage and frequency of the driven signal outputted from the normal driver Mu or Md; and
 drive the lower-arm (lower-side) switching element Qd such that the lower-arm switching element Qd is always on.

With this configuration, the upper-arm switching element Qu has an electric potential higher than a basic electric potential N that becomes an electric potential on which the power converter operates. Thus, because heat is likely generated in the upper-arm switching element Qu rather than the lower-arm switching element Qd, control of on/off drive of the upper-arm switching element Qu allows the total heat quantity to be reduced. Thus, it is possible to more reliably prevent damage to the switching elements Qu and Qd.

Second Embodiment

A second embodiment is an example obtained by applying an example configuration shown in the first embodiment to an inverter. The second embodiment will be described hereinafter with reference to FIG. 6. To facilitate the description, in the second embodiment, different points between the first and second embodiments will be described. For this reason, to elements, which are the same as the elements illustrated in FIGS. 1 and 4, the identical characters are assigned, and the descriptions of them are omitted.

Figure 6:
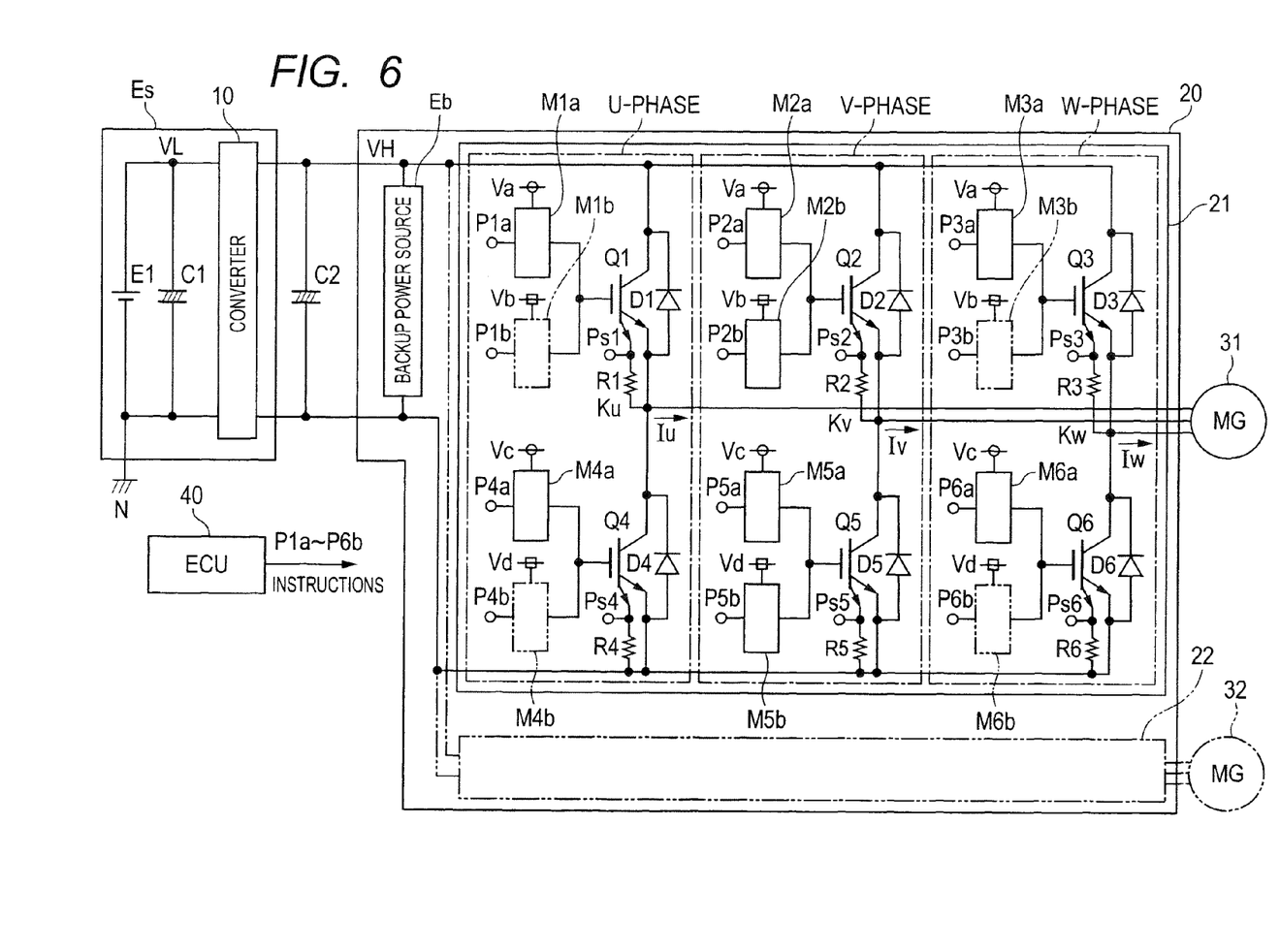
FIG. 6 is a view illustrating an example of the application of an inverter.

The inverter 20 illustrated in FIG. 6 includes one or more power converting units 21, 22, . . . , and is configured to implement at least one of a power supplying function and a power transmitting function. The power supplying function is to convert DC power (voltage VH, for example, 650 V) supplied from a DC power source E1 via a converter 10 into three-phase AC power, and supply the three-phase AC power to corresponding motor-generators 31, 32, . . . . The power transmitting function is to rectify three-phase AC power generated by the corresponding motor-generators 31, 32, . . . , and return rectified power to the DC power source E1 via the converter 10. A smoothing capacitor C1 is connected to output terminals of the DC power source E1. A smoothing capacitor C2 is provided between the converter 10 and the inverter 10, inside the converter 10, or inside the inverter 20. Because the power converting units 21, 22, . . . have the same structure, the structure of the power converting unit 21 will be typically described.

The power converting unit 21 includes normal drivers M1a-M6a, discharging drivers M1b-M6b, switching elements Q1-Q6, diodes D1-D6, resistors R1-R6, and so on. The normal drivers M1a to M3a, discharging drivers M1b to M3b, switching elements Q1 to Q3, diodes D1 to D3, and resistors R1 to R3 are located at the upper arm, and the normal drivers M4a to M6a, discharging drivers M4b to M6b, switching elements Q4 to Q6, diodes D4 to D6, and resistors R4 to R6 are located at the lower arm.

Each of the normal drivers M1a to M3a is activated when receiving power (voltage Va) supplied from a normal driving power source based on an output terminal of a corresponding one of the switching elements Q1 to Q3 as a reference electric potential. Each of the normal drivers M4a to M6a is activated when receiving power (voltage Vc) supplied from a normal driving power source based on an output terminal of a corresponding one of the switching elements Q4 to Q6 as a reference electric potential. Each of the normal drivers M1a to M6a is operative to output a drive signal to a control terminal of a corresponding one of the switching elements Q1 to Q6 according to an instruction inputted from the ECU 40 to a corresponding one of terminals P1a to P6a.

Each of the discharging drivers M1b to M3b is activated when receiving power (voltage Vb) supplied from the backup power source Eb based on an output terminal of a corresponding one of the switching elements Q1 to Q3 as a reference electric potential. Each of the discharging drivers M4b to M6b is activated when receiving power (voltage Vd) supplied from the backup power source Eb based on an output terminal of a corresponding one of the switching elements Q4 to Q6 as a reference electric potential. Each of the discharging drivers M1b to M6b is operative to output a drive signal to the control terminal of a corresponding one of the switching elements Q1 to Q6 according to an instruction inputted from the ECU 40 to a corresponding one of terminals P1b to P6b.

Note that the power converter 21 may be provided with at least one of the aforementioned discharging drivers M1b to M6b. In the example configuration illustrated in FIG. 6, the discharging drivers M2b and M5b are provided for the V phase (see the solid lines), but the discharging drivers M1b and M4b or the discharging drivers M3b and M6b can be provided for the corresponding phase only. The discharging drivers for any two phases, such as the U phase and V phase, can be only provided, or the discharging drivers for the respective three phases can be provided.

Like the first example configuration according to the first embodiment, the power converter 21 can be provided with one discharging driver can be provided for one phase, that is, a set of switching element connected longitudinally in series, or with discharging drives corresponding to the discharging drivers of the second example configuration (see FIG. 4) or the discharging drivers of the third example configuration (see FIG. 5).

A single normal driving power source can be provided or a plurality of normal driving power sources can be provided for the respective normal drivers M1a to M6a. This can be applied for the backup power source Eb. A single backup power source Eb can be provided as illustrated in FIG. 6, or a plurality of backup power sources can be provided for the respective discharging drivers M1b to M6b. Note that the voltages Va, Vb, Vc. and Vd are the same voltage, but are not limited thereto. Specifically, the voltages Va, Vb, Vc, and Vd can be different from each other depending on the differences of the corresponding reference electric potentials.

Each of the switching elements Q1 to Q6 corresponds to the switching element Qn illustrated in FIG. 2. As the switching elements Q1 to Q6, IGBTs equipped with sense terminals Ps1 to Ps6 are used as an example. Each of the diodes D1 to D6 is connected between an input terminal and an output terminal of a corresponding one of the switching elements Q1 to Q6 and in parallel therewith. Each of the diodes D1 to D6 serves as a free-wheel diode. The output terminal of each of the switching elements Q2, Q4, and Q6 is connected to a basic electric potential N. Each of the resistors R4 to R6 is connected between a corresponding one of the sense terminals Ps4 to Ps6 and the basic electric potential N. The resistors R1 to R3 are connected to the output terminals of the corresponding switching elements Q1 to Q3, respectively. The basic electric potential N is a common electric potential (a common potential ground) in the power converter 21, and becomes 0 V when grounded.

Circuit elements in the power converter 21 are divided into the three phases (U phase, V phase, and W phase in this embodiment) as illustrated by the dash-dot line. Operations of the circuit elements are controlled by the ECU 40 for each phase. The U phase is comprised of the normal drivers M1a and M4a, the discharging drivers M1b and M4b, the switching elements Q1 and Q4, the diodes D1 and D4, the resistors R1 and R4, and so on. The V phase is comprised of the normal drivers M2a and M5a, the discharging drivers M2b and M5b, the switching elements Q2 and Q5, the diodes D2 and D5, the resistors R2 and R5, and so on. The W phase is comprised of the normal drivers M3a and M6a, the discharging drivers M3b and M6b, the switching elements Q3 and Q6, the diodes D3 and D6, the resistors R3 and R6, and so on. The U-phase upper and lower switching elements Q1 and Q4 are connected in series to form a half bridge. Similarly, the V-phase upper and lower switching elements Q2 and Q5 are connected in series to form a half bridge, and the W-phase upper and lower switching elements Q3 and Q6 are connected in series to form a half bridge. A connection point of the half bridge of each phase is connected to a corresponding one of three-phase terminals of the motor-generator 31 via a corresponding one of lines Ku, Kv, and Kw. Through the lines Ku, Kv, and Kw, U-phase current Iu, V-phase current Iv, and W-phase current Iw flow, respectively.

The ECU 40 controls the overall operations of the converter 10, the inverter 20, and so on. The ECU 40 can be configured such that: a CPU (a microcomputer) performs software control; or electronic elements including ICs (LSIs), gate arrays, and the like) and transistors perform hardware control.

The following is the association with the first embodiment. The power converter 21 corresponds to the power converter. The DC power source E1, the capacitor C1, and the converter 10 correspond to the power source Es. The capacitor C2 corresponds to the smoothing capacitor Ca, each of the upper-arm switching elements Q1, Q2, and Q3 corresponds to the switching element Qu, and each of the lower-arm switching elements Q4, Q5, and Q6 corresponds to the switching element Qd. Each of the diodes D1, D3, and D5 corresponds to the diode Du, and each of the diodes D2, D4, and D6 corresponds to the diode Dd. Each of the normal drivers M1a, M3a, and M5a corresponds to the normal driver Mu, and each of the normal drivers M2a, M4a, and M6a corresponds to the normal driver Md. Each of the discharging drivers M1b to M6b corresponds to the discharging driver Mb, and the ECU 40 corresponds to the controller CU.

Each of the sense terminals Ps1 to Ps6 corresponds to the sense terminal Psn as a structural element of the overcurrent protection means Mc, and each of the resistors R1 to R6 connected between a corresponding one of the sense terminals Ps1 to Ps6 and a corresponding output terminal is equivalent to the resistor Rn as a structural element of the overcurrent protection means Mc.

The power converter 21 operates as follows. During a normal period, a drive signal is transmitted from each of the normal drivers M1a to M6a to the control terminal of a corresponding one of the switching elements Q1 to Q6 according to an instruction inputted from the ECU 40 to a corresponding one of the terminals M2b and M5b. This converts power supplied from the converter 10, and the converted power is outputted to the motor-generator 31. During a discharge period, a drive signal is transmitted from each of the discharging drivers M2b and M5b to the control terminal of a corresponding one of the switching elements Q2 and Q5 according to an instruction inputted to a corresponding one of the terminals P2b and P5b from the ECU 40. Alternatively, during a discharge period, a drive signal is transmitted voluntarily from each of the discharging drivers Q2 and Q5 to the control terminal of a corresponding one of the switching elements Q2 and Q5.

Specifically, as illustrated in FIG. 3, an upper-arm drive signal is transmitted to the switching element Q2, and a lower-arm drive signal is transmitted to the switching element Q5, thus discharging charge stored in the smoothing capacitor C2.

The inverter circuit 20 (the power converters 21, 22, . . . ) according to the second embodiment applies the discharging driver Mb to each of the discharging drivers M2b and M5b, thus achieving functions and effects identical to those of the first embodiment.

Third Embodiment

A third embodiment is an example obtained by applying the first example configuration shown in the first embodiment to a converter. The third embodiment will be described hereinafter with reference to FIG. 7. To facilitate the description, in the third embodiment, different points between the first and third embodiments will be described. For this reason, to elements, which are the same as the elements according to the first embodiment, the identical characters are assigned, and the descriptions of them are omitted.

Figure 7:
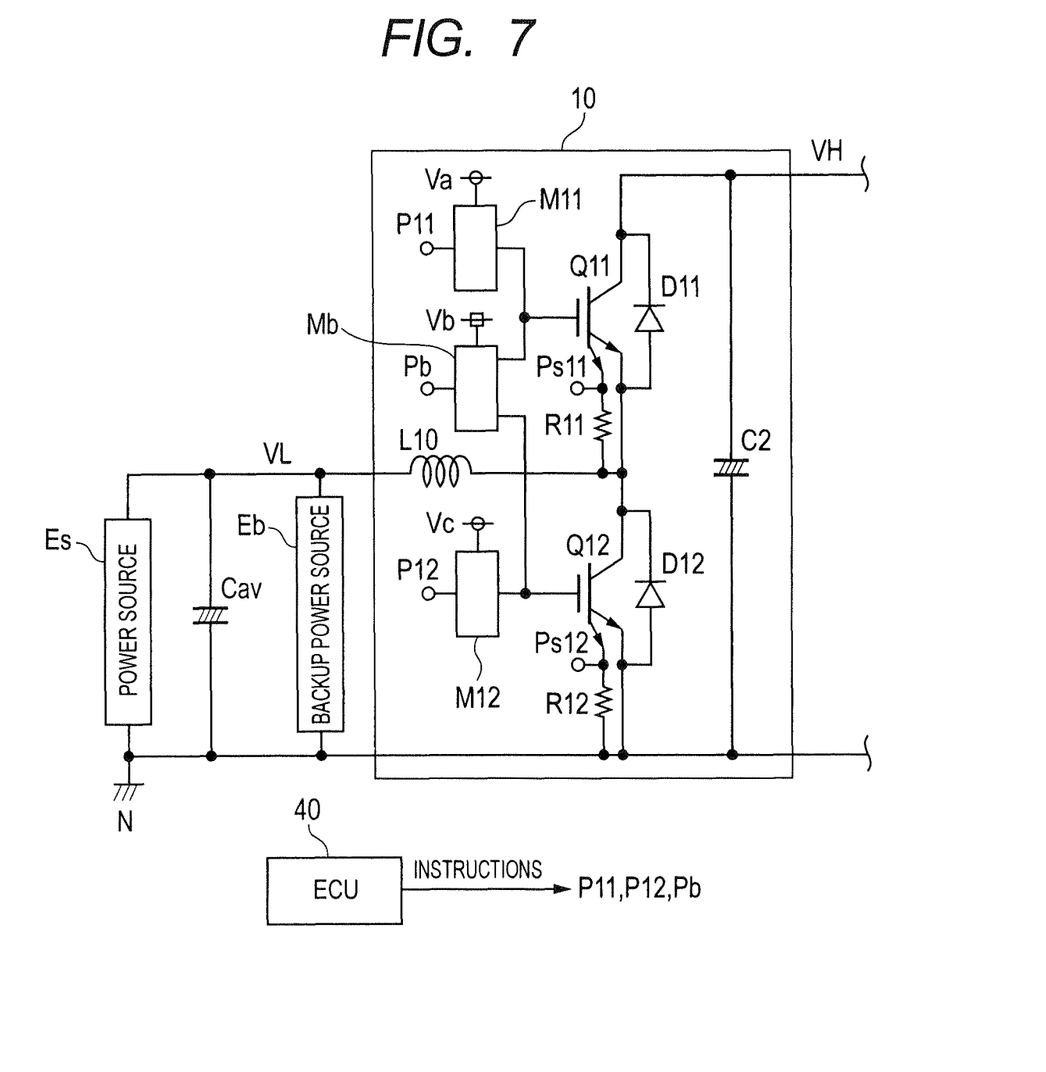
FIG. 7 is a view illustrating an example of the application of a converter.

The converter 10 illustrated in FIG. 7 includes normal drivers M11 and M12, a discharging driver Mb, switching elements Q11 and Q12, diodes D11 and D12, an inductor L10, resistors R1 and R2, and so on in order to implement a boosting function to boost power (voltage VL) supplied from the power source Es, and output the boosted power.

The normal driver M11 is activated when receiving power (voltage Va) supplied from a normal driving power source based on an output terminal of the switching element Q11 as a reference electric potential. The normal driver M12 is activated when receiving power (voltage Vc) supplied from a normal driving power source based on an output terminal of the switching element Q12 as a reference electric potential. Each of the normal drivers M11 and M12 is operative to output a drive signal to a control terminal of a corresponding one of the switching elements Q11 and Q12 according to an instruction inputted from an ECU 40 to a corresponding one of terminals P11 and P12.

A discharging driver Mb is activated when receiving power (voltage Vb) supplied from the backup power source Eb based on the output terminal of the switching element Q11 as a reference electric potential. The discharging driver Mb is activated when receiving power (voltage Vd) supplied from the backup power source Eb based on the output terminal of the switching element Q12 as a reference electric potential. Each of the discharging drivers Mb is operative to output a drive signal to the control terminal of a corresponding one of the switching elements Q11 and Q12 according to an instruction inputted from the ECU 40 to a terminal Pb. Note that the voltages Va, Vb, Vc. and Vd are the same voltage, but are not limited thereto as well as the second embodiment. Specifically, the voltages Va, Vb, Vc, and Vd can be different from each other depending on the differences of the corresponding reference electric potentials.

The upper and lower switching elements Q11 and Q12 are connected in series to form a half bridge. As the switching elements Q11 and Q12, IGBTs equipped with sense terminals Ps11 and Ps12 are used respectively as an example. The resistor R12 is connected between the sense terminal Ps12 and a basic electric potential N. The resistor R11 is connected between the sense terminal Ps11 and a mid connection point between the output terminal of the switching element Q11 and the input terminal of the switching element Q12. The mid connection point is connected to the positive electrode of the power source Es via the inductor L10. As the inductor L10, a choke coil is used as an example. Each of the diodes D11 and D12 is connected between an input terminal and an output terminal of a corresponding one of the switching elements Q11 and Q12 and in parallel therewith. Each of the diodes D11 and D12 serves as a free-wheel diode. The output terminal of the switching element Q12 is connected to the negative electrode of the power source Es.

The following is the association with the first embodiment. The converter 10 corresponds to the power converter. The switching element Q11 corresponds to the switching element Qu, and the switching element Q12 corresponds to the switching element Qd. The diode D11 corresponds to the diode Du, and the diode D12 corresponds to the diode Dd. The normal driver M11 corresponds to the normal driver Mu, and the normal driver M12 corresponds to the normal driver Md. The ECU 40 corresponds to the controller CU.

Each of the sense terminals Ps11 and Ps12 corresponds to the sense terminal Psn as a structural element of the overcurrent protection means Mc, and each of the resistors R11 and R12 connected between a corresponding one of the sense terminals Ps11 and Ps12 and a corresponding output terminal is equivalent to the resistor Rn as a structural element of the overcurrent protection means Mc.

The converter 10 operates as follows. During a normal period, a drive signal is transmitted from each of the normal drivers M11 and M12 to the control terminal of a corresponding one of the switching elements Q11 and Q12 according to an instruction inputted from the ECU 40 to a corresponding one of the terminals P11 and P12. This converts (boosts) power supplied from the power source Es, and outputs the converted power.

For example, turning on the switching element Q12 charges the inductor L10. Thereafter, the switching element Q12 is turned off, and the switching element Q11 is turned on. This results in an output voltage VH of the converter 10; the output voltage VH is equal to the sum of the DC voltage of the power source Es and the voltage charged in the inductor L10.

During a discharge period, a drive signal is transmitted from the discharging driver Mb to the control terminal of each of the switching elements Q11 and Q12 according to an instruction inputted to the terminal Pb from the ECU 40. Alternatively, during a discharge period, a drive signal is transmitted voluntarily from the discharging driver Mb to the control terminal of a corresponding one of the switching elements Q11 and Q12.

Specifically, as illustrated in FIG. 3, an upper-arm drive signal is transmitted to the switching element Q11, and a lower-arm drive signal is transmitted to the switching element Q12, thus discharging charge stored in the smoothing capacitor Cav.

The converter 10 according to the third embodiment uses the discharging driver Mb of the first example configuration, thus achieving functions and effects identical to those of the first embodiment. Note that, when using the second example configuration (see FIG. 4) or the third example configuration (see FIG. 5), the converter 10 according to the third embodiment can achieve functions and effects identical to those of the first embodiment.

Other Embodiments

Embodiments of the present invention have been described in accordance with the first to third embodiments, but the present invention is not limited to any of the first to third embodiments. In other words, the present invention can be used in various forms within the scope of the present invention. For example, the following embodiments can be implemented.

In each of the first to third embodiments set forth above, a drive signal for performing on/off drive of the switching element (upper arm) Qu is configured such that its frequency is changed with the threshold voltage Vt unchanged (see FIG. 3), but can be configured such that: the threshold voltage Vt is changed with the frequency unchanged; or the threshold voltage Vt is changed with change in the frequency. That is, the drive signal can be controlled by a voltage and a frequency within respective predetermined ranges lower than the voltage and frequency of the drive signal outputted from the normal drivers Mu and Md. With these configurations, the overheat protection means Mh protects the temperature of the switching element Qu from exceeding an allowable temperature, and the overcurrent protection means Mc prevents current flowing through the switching element Qu and Qd from exceeding an allowable current value. Thus, it is possible to reliably prevent damage to the switching element Qu and the like.

Each of the first to third embodiments set forth above is configured to monitor the current I to thereby control a drive signal, thus changing the drive signal (see FIG. 3), but it can be configured to monitor the temperature Tn to thereby control a drive signal, thus changing the drive signal, or to monitor both the current I and the temperature Tn to thereby control a drive signal. In addition, at least one of these embodiments can be combined with another one of these embodiments. In this case, it had better be able to control the current I flowing through the switching elements Qu and Qd and the temperature Tn of the switching element Qu such that the current I is lower than an allowable current value and the temperature Tn is lower than an allowable temperature. In these configurations, the overheat protection means Mh prevents the switching element Qu from exceeding an allowable temperature, and the overcurrent protection means Mc prevents the current flowing through the switching elements Qu and Qd from exceeding an allowable current value as well as each of the first to third embodiments. Thus, it is possible to more reliably prevent damage to the switching element Qu and the like.

Each of the first to third embodiments set forth above is configured to turn on/off the upper-arm switching element Qu, and control the lower-arm switching element Qd such that it is always on (see FIG. 3), but can be configured to turn on/off the lower-arm switching element Qd, and control the upper-arm switching element Qu such that it is always on. Because this is to replace the upper switching element with the lower switching element, it is possible to achieve the same functions and effects as the first to third embodiments.

Figure 8:
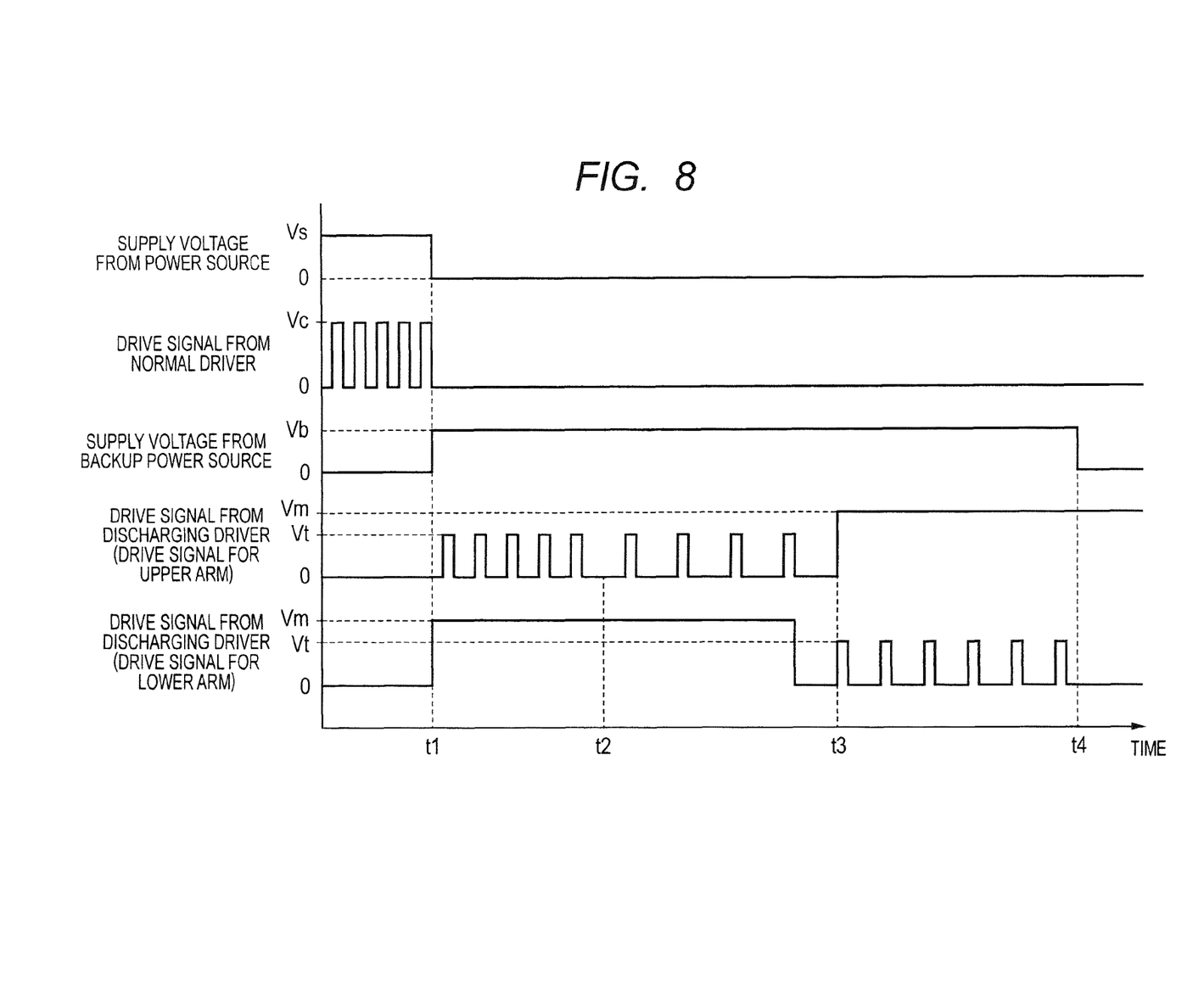
FIG. 8 is a timing chart indicative of a time-dependent change in a second example of operations during discharging.

Each of the first to third embodiments set forth above is configured to turn on/off one switching element (the upper-arm switching element) Qu, and control the other switching element (the lower-arm switching element) Qd such that it is always on (see FIG. 3), but can be configured to switch between a switching element to be turned on/off and a switching element to be always on when a switching condition is met. The switching condition can be optionally established. For example, in an example of control illustrated in FIG. 8, a switching element to be turned on/off is switched to the lower-arm switching element at time t3 when the rising current I becomes lower than a threshold current It, and a switching element to be always on is switched to the upper-arm switching element. Switching (i.e. changing on to off or of to on likely causes a temperature increase. Therefore, switching can reduce an increase in temperature. Thus, it is possible to achieve the same functions and effects as the first to third embodiments.

Each of the first to third embodiments set forth above is configured to monitor the current I (or the temperature Tn), and control a drive signal, thus changing the drive signal when the monitored current I or temperature Tn reaches a threshold current It (or a threshold temperature Tt) (see FIGS. 3 and 8), but can be configured to monitor an increase/decrease rate of the current I (or the temperature Tn), and control a drive signal, thus changing the drive signal when the monitored increase/decrease rate per unit of time reaches an increase/decrease threshold. If the increase/decrease rate (rate of change) per unit of time is represented by an angle θ in an example of control illustrated in FIG. 3 or FIG. 8, it is possible to change a drive signal each time the angle θ reaches an increasing/decreasing threshold θt. If the increase/decreasing rate is a large value, it can exceed an allowable value quickly. Thus, changing a drive signal quickly makes it possible to more reliably prevent damage to the switching element Qu and the like.

DESCRIPTION OF CHARACTERS

Es Power source
Eb Backup power source
Cav Smoothing capacitor (Capacitor)
Mu, Md Normal driver
Mb Discharging driver
Mh Overheat protection means
Mc Overcurrent protection means
Qu, Qd Switching element
CN Controller
10 Converter (Power converter)
20 Inverter (Power converter)
21, 22, . . . Power converting unit
31, 32, . . . Motor-generator
40 ECU (Controller)
C1, C2 Capacitor
M1a-M6a, M11, M12 Normal driver
M1b-M6b Discharging driver
Q1-Q6, Q11, Q12 Switching element

The invention claimed is:

1. A power converter comprising:
    first and second switching elements located at a high side and a low side relative to a base electric potential and connected in series, the first and second switching elements performing conversion of power from a power source;
    a normal driver that operates on the power to drive the first and second switching elements using a drive signal having a predetermined voltage and frequency;
    a capacitor connected in parallel with the first and second switching elements;
    a backup power source provided separately from the power source, the backup power source supplying power during at least one of a normal period and a discharge period; and
    a discharging driver configured to:
        operate on the power supplied from the backup power source; and
        repeatedly turn on or off one of the first and second switching elements based on a drive signal that has at least one of a voltage and a frequency while driving the other of the first and second switching elements such that the other of the first and second switching elements is always on, the at least one of the voltage and the frequency of the drive signal being within a predetermined range lower than at least one of the predetermined voltage and frequency of the drive signal outputted from the normal driver.

2. The power converter according to claim 1, wherein the discharging driver comprises an overheat protection means that protects the one of the first and second switching elements from overheating, thus preventing a temperature of the one of the first and second switching elements from exceeding an allowable temperature.

3. The power converter according to claim 1, wherein the discharging driver comprises an overcurrent protection means that prevents a current flowing through the other of the first and second switching elements from exceeding an allowable current value.

4. The power converter according to claim 1, wherein the discharging driver turns on or off one switching element corresponding to the high side in the first and second switching elements according to the drive signal having at least one of the voltage and the frequency within the predetermined range lower than a corresponding at least one of the predetermined voltage and frequency of the drive signal outputted from the normal driver, and drives the other switching element corresponding to the low side in the first and second switching elements such that the other switching element is always on.

5. The power converter according to claim 1, wherein the discharging driver is incorporated in the normal driver.

6. The power converter according to claim 1, wherein the power from the power source is DC power, the first and second switching elements are configured to convert the DC power from the power source into AC power, and supply the AC power to an AC load, and the first and second switching elements are provided for at least one phase of the AC load.

7. The power converter according to claim 1, wherein the first and second switching elements are configured to boost the power from the power source, and supply the boosted power to a load.

8. The power converter according to claim 2, wherein the discharging driver comprises an overcurrent protection means that protects a current flowing through the other of the first and second switching elements from exceeding an allowable current value.

9. The power converter according to claim 2, wherein the discharging driver turns on or off one switching element corresponding to the high side in the first and second switching elements according to the drive signal having at least one of the voltage and the frequency within the predetermined range lower than a corresponding at least one of the predetermined voltage and frequency of the drive signal outputted from the normal driver, and drives the other switching element corresponding to the low side in the first and second switching elements such that the other switching element is always on.

10. The power converter according to claim 3, wherein the discharging driver turns on or off one switching element corresponding to the high side in the first and second switching elements according to the drive signal having at least one of the voltage and the frequency within the predetermined range lower than a corresponding at least one of the predetermined voltage and frequency of the drive signal outputted from the normal driver, and drives the other switching element corresponding to the low side in the first and second switching elements such that the other switching element is always on.

11. The power converter according to claim 1, wherein:

the capacitor is connected in parallel with the power source; and the capacitor is also connected in parallel with the backup power source.

12. The power converter according to claim 1, wherein the backup power source supplies power if the power source cannot supply power due to a shutoff cause.

* * * * *